No. 637,686. Patented Nov. 21, 1899.
W. WEIR.
FILTER.
(Application filed Sept. 6, 1898.)
(No Model.) 2 Sheets—Sheet 2.
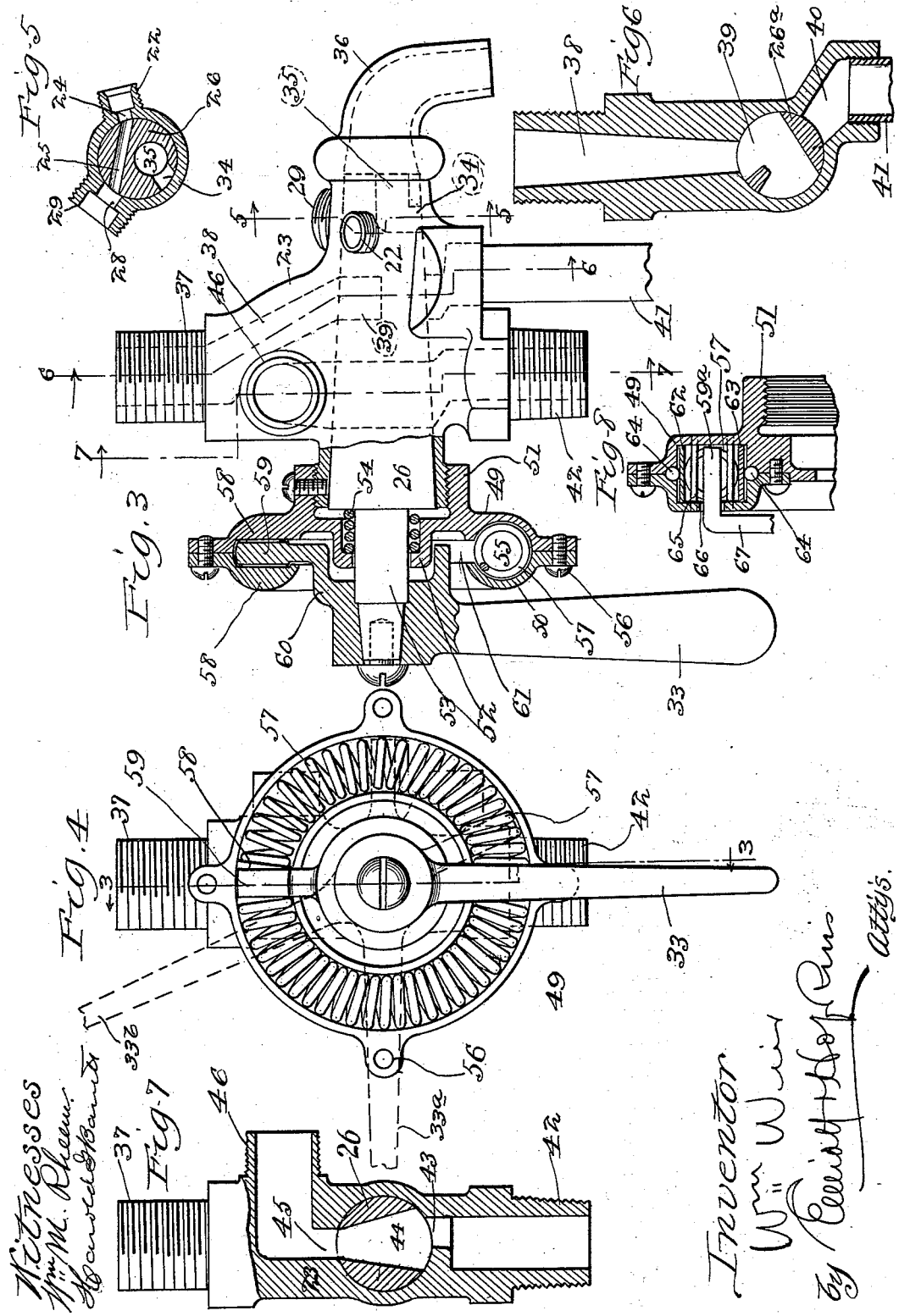

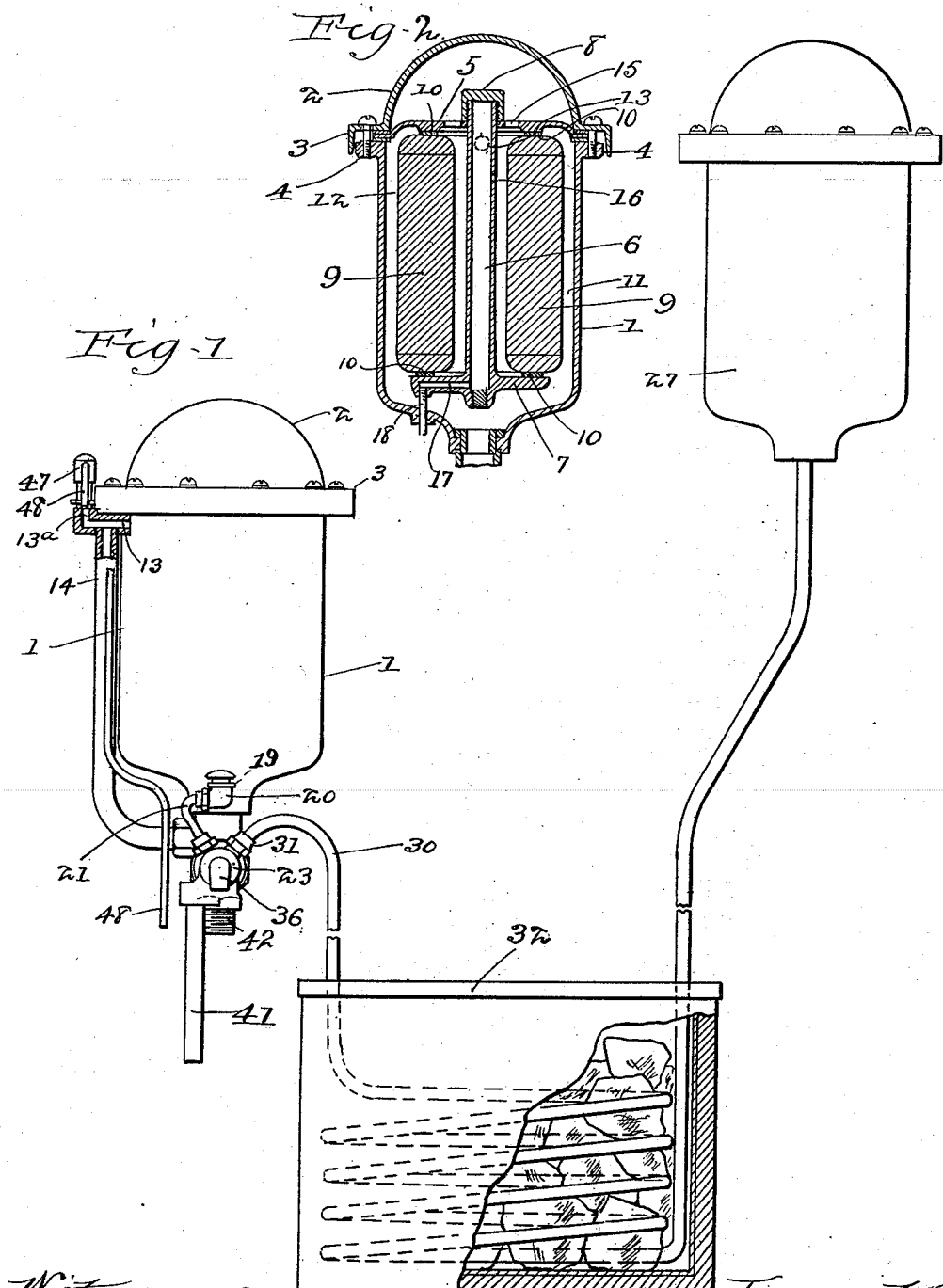

UNITED STATES PATENT OFFICE.

WILLIAM WEIR, OF COLFAX, CALIFORNIA.

FILTER.

SPECIFICATION forming part of Letters Patent No. 637,686, dated November 21, 1899.

Application filed September 6, 1898. Serial No. 690,259. (No model.)

*To all whom it may concern:*

Be it known that I, WILLIAM WEIR, a citizen of the United States, residing at Colfax, in the county of Placer and State of California, have invented certain new and useful Improvements in Filters, of which the following is a full, clear, and exact specification.

My invention relates to that class of filters used in direct connection with the service water-pipe or other supply under pressure and being so constructed that the filtered water may pass from the filter into a reservoir for use as needed, or a small quantity thereof may be forced backward through the filtering medium for cleansing the latter, or, when desired, the water may be drawn directly from the supply without passing through the filtering medium, but contacting with the outer surface thereof, so as to flush the filter whenever straight or unfiltered water is drawn.

One of the objects of my invention is to employ the same valve for controlling the flow of water to the filter and for drawing off the filtered water, a further object being to have the same valve also control the flushing-passage, which is utilized for drawing water direct from the supply.

Another object of my invention is to provide certain improvements in the valve-operating mechanism whereby the same may be readily placed in any of the required positions and when released will automatically return to a predetermined normal position.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a general view of my improved filter, showing the pipe which connects the filter with the reservoir coiled in a cooling-chamber. Fig. 2 is a detail vertical section of the filter proper. Fig. 3 is an enlarged side elevation, partly in vertical section, of the valve and valve-housing. Fig. 4 is an end view thereof with the cap of the spring-box removed. Fig. 5 is a transverse vertical section taken on the line 5 5, Fig. 3, looking in the direction of the arrows. Fig. 6 is a vertical transverse section taken on the line 6 6, Fig. 3. Fig. 7 is a vertical transverse section taken on the line 7 7, Fig. 3; and Fig. 8 is a similar section to that shown in Fig. 3, illustrating a modification by which the spring is provided with antifriction-bearings, as will be hereinafter described.

In carrying out my invention I prefer to employ that type of filter in which water is filtered by being forced through an annular wall of filtrant material—such, for instance, as a porous cylinder the interior of the cylinder constituting a chamber for receiving the filtered water, while the chamber containing the cylinder and the outer wall of the cylinder constitute a chamber for receiving the water from the service-pipe or other supply.

1 represents the body of the filter-chamber proper, whose upper end is closed by a removable cap 2, having a flange 3, secured to a flange 4 on the upper end of the body 1. Fastened between these flanges 3 4 is a plate 5, upwardly through which loosely passes a hollow rod or pipe 6, whose lower end is provided with a disk 7, rigidly secured thereto, while the upper end of the pipe or hollow rod 6 is screw-threaded and provided above the plate 5 with a nut 8, so that the disk 7 and the rod 6 may be supported from the plate 5, and the filtrant-cylinder 9, which is located around the rod 6 and between the plate 5 and disk 7, may be securely clamped between such plate 5 and disk and the whole supported within the chamber 1 from the plate 5, gaskets 10 being located at the upper and lower ends of the cylinder 9, as will be understood. By this means it will be seen that I constitute two annular chambers—one, 11, surrounding the cylinder 9 and being the receiving-chamber for the unfiltered water, while the other, 12, being within the cylinder 9 and constituting the chamber for the filtered water. The water to be filtered is admitted to the chamber 11 through an inlet-passage 13 in communication with pipe 14, as will be hereinafter more fully described, and after entering the chamber 11 oozes through the pores of the cylinder 9 into the chamber 12, in which it rises and compresses the air therein upward into the cap 2, which constitutes a dome, the air being admitted to such cap through apertures 15 in the plate 5. When the water in the chamber 12 has risen as far as a small aperture 16, formed in the upper end of the pipe 6, it passes downwardly through the pipe 6 and thence along a duct 17, formed in the disk 7, to a downwardly-extending tube 18, which projects through a suitable stuffing-box 19 in the bottom of the chamber 1 and is coupled by an elbow 20, having suitable packing-glands, to a tube 21, which leads to a threaded nipple 22, formed on the valve-housing 23 and surrounding a port 24 in such housing. Under normal conditions the filtered water passes through the port 24 in the housing and enters a way or passage 25, formed in a valve-plug 26, which is of the ordinary conical form, and from such passage or way 25 it passes on to the reservoir 27 through a port 28, formed in the valve-housing and surrounded by a threaded nipple 29, having connection with the reservoir 27 by suitable pipe 30 and packing-gland 31. If desired, the pipe 30 on its way to the reservoir and at any suitable point in its length may be carried through a cooling or refrigerating chamber 32 for cooling the water on its way to and from the reservoir 27.

When it is desired to draw filtered water, the valve-plug 26 is given about a quarter-turn, carrying the handle 33 from the position shown in full lines in Fig. 4 to the dotted position 33ª and bringing a lateral port 34 in the valve into coincidence with the port 28, the lateral port 34 being in communication with an axial or longitudinal port 35, extending through the outer end of the plug 26 and communicating with the discharge-nozzle 36 of the valve-housing, thus cutting the filtered-water chamber 12 out of communication with the reservoir. This movement of the valve-plug places the receiving-chamber 11 in communication with a flushing-passage, as I will now describe, so that the air confined in the dome 2 will force the filtered water in the chamber 12 backwardly through the filtrant-cylinder 9 and into the receiving-chamber 11, thus purging the pores of the filtrant-cylinder of all impurities by means of pure filtered water. The upper side of the valve-housing 23 is provided with a threaded neck 37, screwed into the bottom of the chamber 1, and the said impurities carried into the chamber 11 by the filtered water oozing backwardly through the cylinder 9 are carried off through a port or passage 38, extending downwardly through this neck 37 and communicating with a way or passage 39, formed in the plug or valve 26, as shown in dotted lines in Fig. 3 and in section in Fig. 6, so that when the valve-plug 26 is given a quarter-turn from the position shown in Fig. 5 the port or passage 39 will place the flushing-passage 38 in communication with an outlet-port 40, formed in the lower side of the valve-housing and discharging into any suitable sink-pipe 41. The lower side of the valve-housing just under the neck 37 is provided with a threaded neck 42, which may be screwed or otherwise connected to the service-pipe, and its interior passage communicates with a port 43 in the valve-housing, so arranged as to be controlled by the valve-plug 26. When the valve-plug 26 is in the position indicated in the drawings, or what is preferably the normal position, a way or passage 44 in the valve-plug places the neck 42 in communication with a port 45 in the valve-housing, which leads to a threaded nipple 46 on the side of the housing, and this threaded nipple 46 is connected by the pipe 14 to the inlet 13 at the upper end of the casing 1. The inlet 13 is formed in a boss 13ª on the side of the casing, which has a horizontal passage connecting the pipe 14 with the inlet 13 and also connecting with an air-inlet valve 47, projecting upwardly therefrom and having a downwardly-extending air-supply pipe 48, so that as the water rushes into the casing through the pipe 14 it will be aerated and purified by the air admitted through the valve 47. The water of course after entering the receiving-chamber 11 percolates through the filtrant-chamber 9 into the chamber 12 and thence passes into the reservoir 27 via the connections already described, the valve being in the position shown in the drawings, which is preferably the normal position.

Should it be desired to draw straight water or water direct from the supply without passing it through the filtrant, the valve-handle 33 is given almost a half turn or revolution, as shown at 33ᵇ in Fig. 4, so that the upper end of the way 44 will be brought down into communication with the port 43, such port 43 being offset to one side, as shown in Fig. 7, so as to connect with the way 44, and the lower end of the way 44 will connect with the port 45, thus maintaining direct connection between the supply and the receiving-chamber 11. This movement of the valve carries the blank 26ª of the valve-plug 26 (shown in Fig. 6) to the left-hand side of the port or passage 38 and uncovers the port 40, so that a free passage is established between the receiving-chamber 11 and the sink-pipe 41, and at the same time the way 25 in the valve-plug is cut off from communication with both of the ports 24 28. By this means it will be seen that the filtrant-cylinder 9 having been purged of impurities by the retrograde movement of the filtered water each time filtered water is drawn and such impurities lodged on the exterior of the cylinder or in the receiving-chamber 11 an energetic flow of water may be produced through the receiving-chamber and around the filtrant-cylinder for flushing such receiving-chamber and cleansing the exterior of the filtrant-cylinder every time straight or unfiltered water is drawn.

One end of the valve-housing 23 is provided with a box, in which is located a spring or other cushion for returning the valve-plug to any desired position. As shown in the drawings, this box preferably consists of two portions 49 50, the portion 49 being provided with a threaded neck 51, screwed onto the end of the valve-housing and having a socket 52, through which the reduced stem 53 of the valve-plug passes, and in which socket is located a spring or cushion 54 for holding the valve-plug tight. The members 49 50 of the spring-box are each provided with one-half of an annular casing 55, the members of the box being secured together by screws and flanges 56, and in this casing is located a coil-spring 57, whose ends abut against abutments 58, formed one on each of the casing members. These abutments 58, however, have sufficient space between them to permit of the passage of a lug 59, carried by an arm 60, formed on the hub of the handle 33 and projecting into the spring-casing through an annular slot 61, so that when the valve-handle 33 is turned in either direction the lug 59 will compress the spring 57 away from the abutments 58 on one side and toward such abutments on the other side, and when the handle is released it will automatically return to its normal position, the ends of the springs 57 serving as a cushion for relieving the shock which might otherwise be caused by the sudden arrest of the lug 59.

In the modification shown in Fig. 8 I have provided the spring 57 with antifriction-bearings to relieve its friction in the casing. This consists of a pair of concentric rings 62 63, one arranged within and the other surrounding the spring 57 and each fitting approximately close to the inner and outer walls, respectively, of the spring-casing, which in this form is annular but square in cross-section, and interposed between each of the rings and such wall of the casing is a series of balls 64, seated in suitable sockets or grooves, so that when the handle is turned the rings will turn with it, and their friction will be relieved by the antifriction-balls. In this form of the invention the abutment for the ends of the spring 57 is constituted by two cross-bars 65, extending from side to side of the casing and on each side of the slot 66, through which the arm 67, corresponding to the arm 60 before described, projects, the lug 59ª, which compresses the spring 57, being arranged to pass between the abutments 65 and the slot 66 in this instance being formed in the outer side of the spring-casing, as will be understood.

Having thus described my invention, what I claim as new therein, and desire to secure by Letters Patent, is—

1. A filter having in combination a receiving-chamber, a filtered-water chamber, a valve-housing having a filtered-water spout and being connected with the supply and also with said receiving-chamber, a reservoir for filtered water connected with said housing, a connection between said housing and filtered-water chamber, and a valve having ways for placing said filtered-water chamber and reservoir in communication with each other and the reservoir in communication with the filtered-water spout, substantially as set forth.

2. A filter having in combination a receiving-chamber, a filtered-water chamber, a reservoir for filtered water, a valve-housing having a filtered-water spout, a straight water-outlet and a connection between said housing and receiving-chamber and said reservoir and housing, a valve having a way for placing said connection between the receiving-chamber and valve-housing in communication with the straight-water outlet for permitting the air-pressure in the filtered-water chamber to discharge its contents backwardly through the filtrant and into said receiving-chamber, and said valve also having a passage for at the same time connecting the reservoir with said filtered-water spout, substantially as set forth.

3. A filter having in combination a receiving-chamber, a filtered-water chamber, a reservoir for filtered water, a valve-housing having a filtered-water spout and being provided with a port to which the supply is connected, a port to which the receiving-chamber is connected for the inlet of straight water and another port to which the receiving-chamber is connected for the outlet of straight water, a port for the discharge of straight water from the valve-housing independently of the filtered-water spout and ports connected respectively with the filtered-water chamber and the reservoir, and a valve having a way connecting the two latter ports, a way adapted to connect the reservoir-port with the spout and another way adapted to at the same time connect the ports in the housing for the discharge-water from the receiving-chamber, substantially as set forth.

4. A filter having in combination a receiving-chamber, a filtered-water chamber, a filtered-water reservoir, a valve and valve-housing connected with the supply and provided with a flushing-outlet and having a filtered-water spout and ports and ways adapted to normally connect the filtered-water chamber with the reservoir when in one position and when in another position to simultaneously connect the spout with the reservoir and the receiving-chamber with the flushing-outlet, substantially as set forth.

5. A filter having in combination a casing, a filtrant-chamber suspended therein and constituting with said casing a receiving-chamber and a filtered-water chamber, a valve-housing connected with a supply and having a port connecting said supply with the said receiving-chamber, said valve-housing being also provided with a filtered-water spout and a flushing and straight-water outlet connected with said receiving-chamber, a discharge-tube extending from said filtered-water chamber through said casing and communicating with said valve-housing and means for controlling said ports and outlet and placing said tube and spout in communication, substantially as set forth.

6. A filter having in combination a casing, the plate 5 supported therein, the hollow perforated rod 6 passing through said plate and having a nut on one end, a disk on the other end of said rod, a filtrant-cylinder clamped between said plate and disk, a valve-housing, a connection extending from said hollow rod to said valve-housing, a valve in said housing for controlling the discharge through said connection and means for supplying said casing, substantially as set forth.

7. A filter having in combination a receiving-chamber, a filtered-water chamber, a valve-housing having connection with said chambers respectively, a valve-plug in said housing for controlling said connections, a spring box or casing, a coiled spring arranged in an annular form in said casing, abutments interposed between the ends of said spring, and a lug revolving with said plug and located between the ends of said spring, substantially as set forth.

8. A filter having in combination a receiving-chamber, a filtered-water chamber, a valve-housing having connection with said chambers respectively, a valve-plug in said housing for controlling said connections, an annular spring box or casing, a coiled spring located in said spring-box, rings between which said spring is situated, antifriction devices located between said rings and said casing, a lug having connection with said valve-plug and revolving therewith and adapted to engage with said spring, and an abutment for holding said spring against bodily movement, substantially as set forth.

WILLIAM WEIR.

Witnesses:
EDNA B. JOHNSON,
F. A. HOPKINS.